Patented Apr. 29, 1941

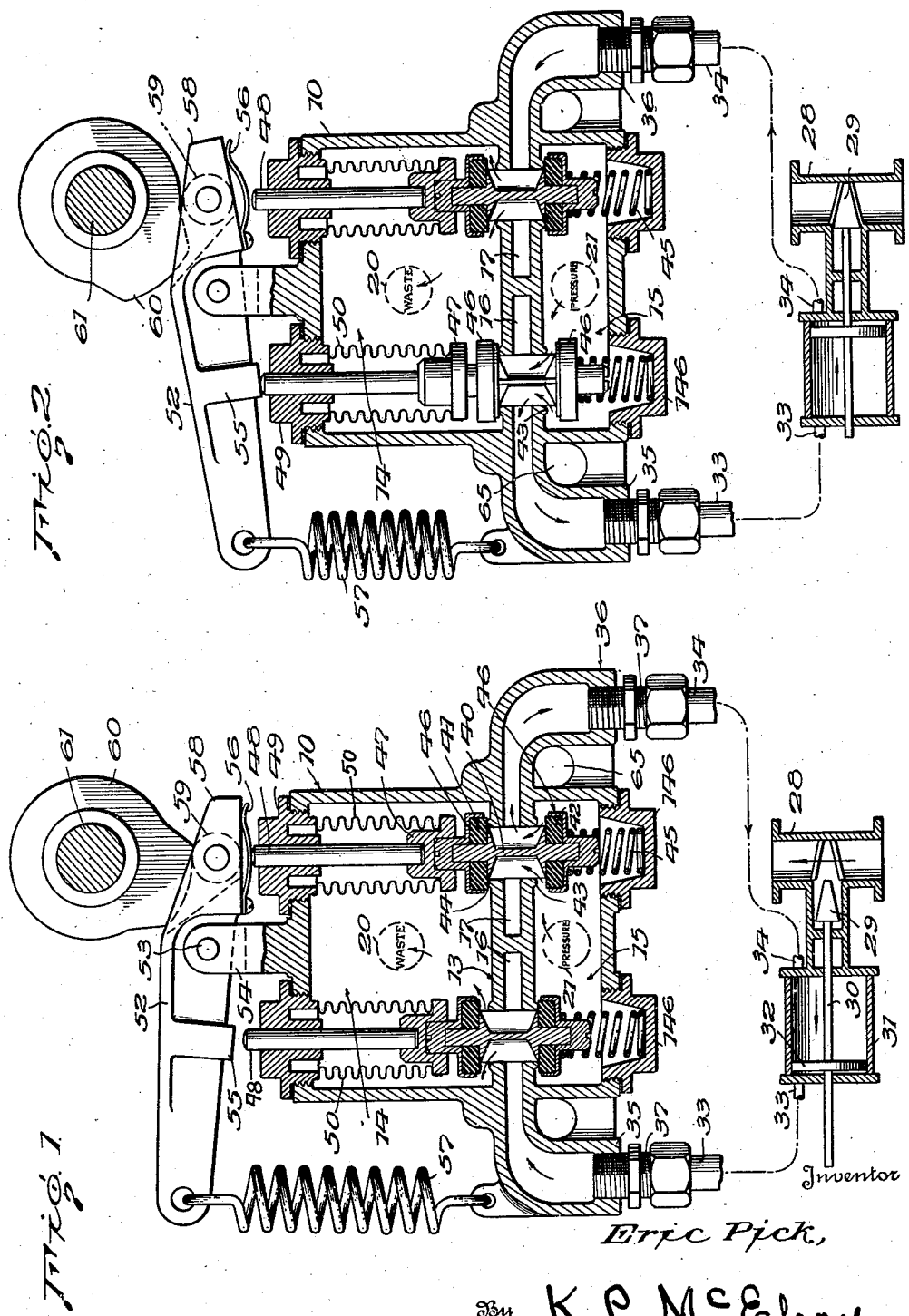

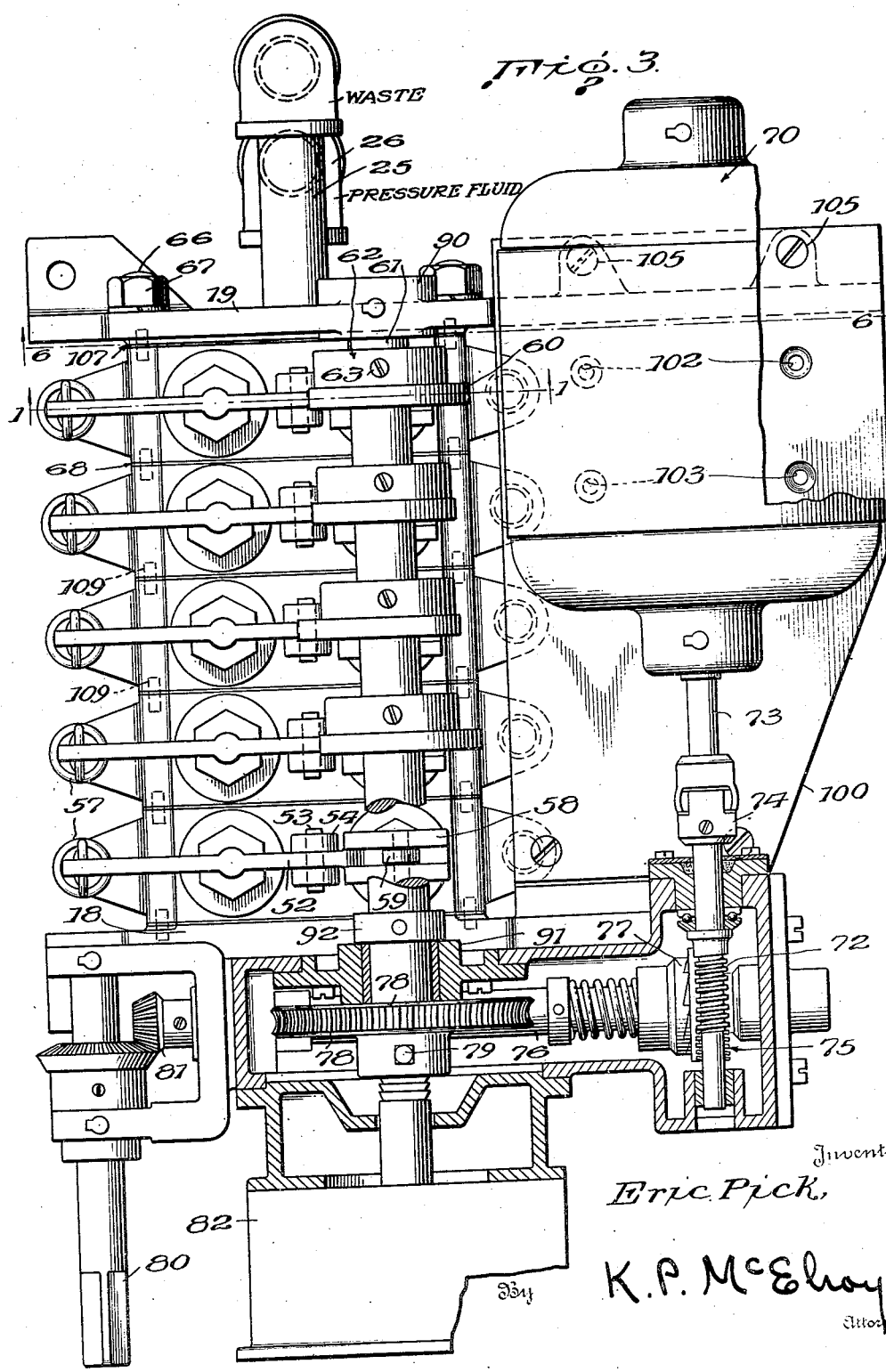

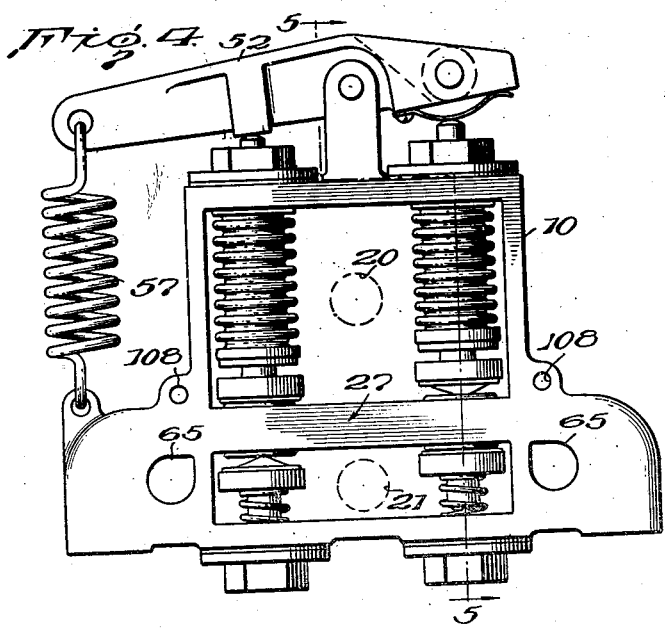
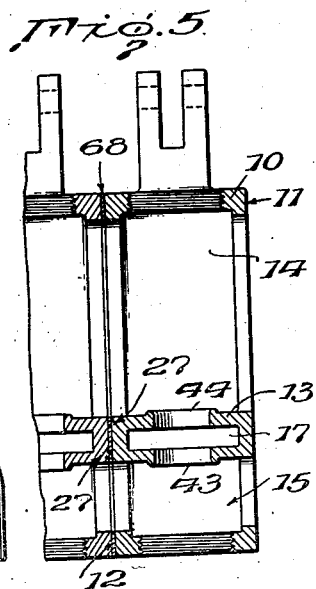
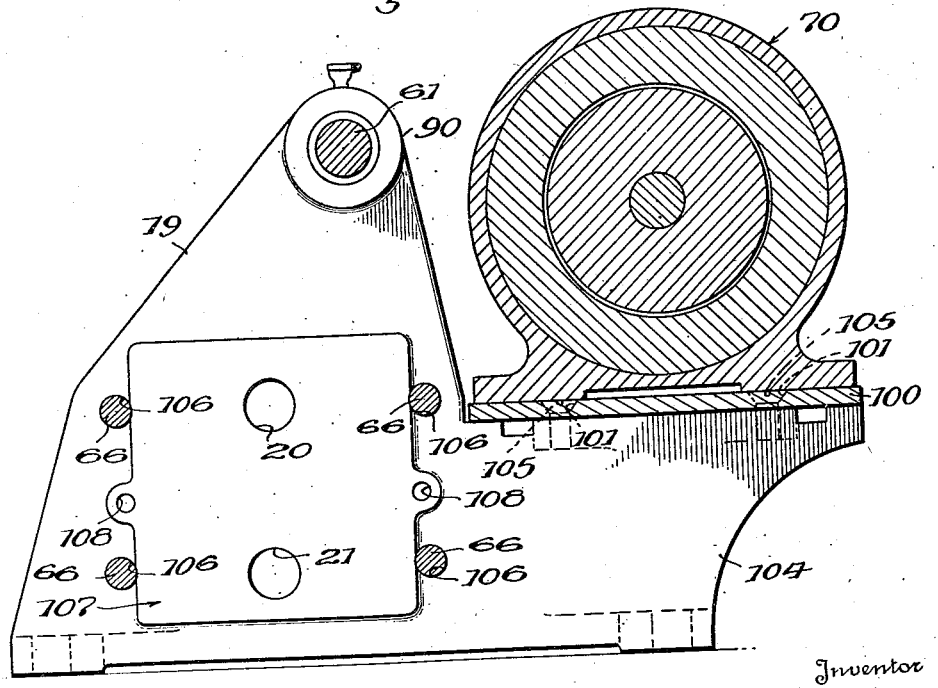

2,240,163

UNITED STATES PATENT OFFICE 2,240,163

VALVE APPARATUS FOR CONTROLLING HYDRAULIC OR PNEUMATIC MACHINES

Eric Pick, East Rockaway, N. Y., assignor to The Permutit Company, New York, N. Y., a corporation of Delaware Application September 30, 1938, Serial No. 232,654

1 Claim. (Cl. 277—20)

This invention or discovery relates to valve apparatus for controlling hydraulic or pneumatic machines; and it comprises a master pilot control valve for such utilization including at least one valve housing having four separate chambers therein, means for connecting one of said chambers to a source of pressure fluid and for venting another of said chambers, means for connecting the remaining two chambers to the hydraulic machine, a pair of two-way, two-position poppets in the housing each arranged in one position to connect one of said last-named chambers with the pressure fluid chamber and in the other position to connect the same last-named chamber with the vented chamber, and means for alternately moving the two poppets in opposite senses so that in one position, pressure fluid is applied through the valve to one side of the hydraulic machine and fluid is exhausted from the other side of the machine, and in the other position these connections are reversed; the chambered valve housings advantageously being arranged as units for construction of multiple pilot valve assemblages of any desired number of valves; all as more fully hereinafter set forth and as claimed.

Zeolite water softeners, filters and certain other types of water treating apparatus require a multiplicity of connections to be made for directing flows of various liquids through the apparatus for various periods and in proper sequence. For example, in a typical zeolite water softener there must be pipe and valve connections for directing a flow of hard water downwardly through the zeolites during the softening stage, and also connections for successively directing backwash water upwardly through the zeolite, treating the zeolite with brine and rinsing out the brine. Typical zeolite softeners require seven separate valves, or the equivalent; and typical filters require five separate valves. Because of the complexity of the operations involved, in some types of water treating apparatus a single, multiport master valve is substituted for the plurality of individual valves so that the various connections are established simply by progressively turning the rotary valve to various angular positions. The valve can be electrically actuated and controlled. This arrangement is better suited for small and medium-sized apparatus than for very large apparatus where the pipes may be several inches in diameter. In very large water treaters there has recently come into use a system wherein a plurality of individual hydraulically actuated (piston or diaphragm) valves are used for the several conduits, and these power valves are controlled and operated by a master rotary pilot valve which can be of relatively small size. My prior Patents 2,076,321 and 2,076,322 disclose systems of this type.

The primitive type of system with separate gate valves has the advantage of flexibility in that new operating steps, such as air-wash steps, can be added by simply installing appropriate additional pipes and valves. This advantage is to some extent lost in the centralized rotary valve type of control, because a rotary multiport valve must be designed as a fixed unit, and the only way to add new steps under control of the master valve is to supply a new master valve.

According to the present invention I provide a pilot control valve apparatus for actuating a set of individual hydraulic valves, which has all the advantages of rotary pilot valves but is characterized by an extreme degree of flexibility. That is, the valve structure is such that addition of new operating steps to the system merely requires adding more units to the basic valve assemblage. Thus according to the invention, there is provided an assemblage of poppet pilot valves in individual housings of such shape that a plurality of housings can be stacked up as desired. Each valve unit comprises a pair of double poppets, arranged in a housing which is in effect sub-divided into four separate chambers, two being in permanent connection with a source of pressure fluid and with waste respectively, and the other two being connected to the opposite ends of one of the piston type valves of the treating apparatus. The two poppets of each unit are arranged to be alternately moved up and down in opposite directions or senses, and in being moved from one position to the other, to connect the opposite ends of the valve cylinder respectively with pressure fluid and waste, and with waste and pressure fluid.

The new valve device is an exceptionally reliable and flexible control apparatus adapted for use with water treating apparatus of any desired degree of complexity, and also adapted to any other utilization where a control valve having its special characteristics is found advantageous or desirable.

In the accompanying drawings I have shown, more or less diagrammatically, an example of a specific embodiment of apparatus within the purview of the invention. Referring to the drawings, Figs. 1 and 2 are views in central vertical section, with some parts in elevation, of one valve unit, taken along line 1—1 of Fig. 3, showing how the valve makes proper fluid connections in its two operating positions;

Fig. 3 is a view in plan of the complete assemblage, five unit valves being shown in the figure;

Fig. 4 is a view in end elevation of one of the valve units complete;

Fig. 5 is a view in vertical section of the valve housing alone of Fig. 4 taken along line 5—5 of Fig. 4; the valves themselves and operating means being omitted from Fig. 5; and Fig. 6 is a view of the rear closure in elevation, looking in the direction of line 6—6 of Fig. 3.

Referring to the drawings, the general combination is shown in Fig. 3, as including a stack of valve units, each of which appears in elevation as in Fig. 4. Figs. 1 and 2 show to best advantage the interior construction and mode of operation of the individual units. As shown, each unit comprises a unitary cast housing 10 having two flat faces 11 and 12 adapted to register with adjacent housings (Fig. 5) and having a hollow partition 13 within the housing arranged to define four separate chambers denoted as 14, 15, 16 and 17. Chambers 14 and 15 extend clear through the housing as is apparent from Figs. 4 and 5, so that in the stack (Fig. 3) the chambers 14 of all the units are in free and open communication and the chambers 15 are in free and open communication. One end of the stack is closed by a solid plate 18 (Fig. 3) and the other end is closed by an end plate 19 (shown by itself in Fig. 6) having two orifices therein 20 and 21, registering respectively with chambers 14 and 15, and connected respectively with a waste conduit 25 and a conduit 26 in permanent communication with a source of liquid under pressure, advantageously the city mains. In Figs. 1, 2 and 4 the end plate 19 with its orifices 20 and 21 is not shown, but the positions of these orifices 20 and 21 are indicated in these figures in dotted lines, for the sake of clarity of presentation.

Chambers 16 and 17 in each valve housing do not communicate with adjacent valve housings, being blocked off by wall portions 27. These two chambers communicate with the opposite ends of a piston valve or other type of hydraulic apparatus which is to be controlled by the pilot valve. Figs. 1 and 2 show, by way of illustration of such controlled apparatus, a hydraulic valve, to a greatly reduced scale and in a diagrammatic manner. The hydraulic valve which can be of any suitable type, includes a valve body 28, a gate 29 mounted on a piston rod 30, a cylinder 31 and a piston 32 arranged to open and close the valve gate. The cylinder has two conduit connections 33 and 34, which are connected, as indicated diagrammatically in Figs. 1 and 2, with valve passages 16 and 17. For this purpose passages 16 and 17 are prolonged into socket members 35 and 36 threaded to receive coupling members 37 for tubing 33 and 34.

The housing contains two separate poppets, which can be of identical construction as shown, each of which includes a body portion 40 extending through partition 13, and two discs 41 and 42 of soft rubber or the like adapted to abut raised annular seat portions 43 and 44 on partition 13. The body member is made long enough so that each poppet can slide back and forth to two positions, to engage the opposite sides alternately as will be apparent from Figs. 1 and 2. Each poppet is urged upwardly by a coil spring 45 abutting a cap member 46 threaded to the lower end of the poppet body member. The coil spring is retained by a screw cap 146. The upper end of the body member has an exactly similar cap 46 which is engaged by a socket 47 retained to a pin 48 extending upward through a cap 49 beyond the housing 10, as shown. A flexible metal bellows 50 is hermetically sealed to the cap 49 and socket 47 to provide a permanent fluid tight connection. Unscrewing caps 146 and 49 allows the entire poppet assemblies to be readily dismounted.

The poppets are actuated in unison in opposite senses by a lever 52 pivotally attached at 53 to a fork 54 centrally located on the housing, as shown. Lever 52 has a platform 55 opposite the upper end of one of the rods 48, and a leaf-spring 56 for the other rod 48. Thus on reciprocation of the lever the poppet valves are alternately moved up and down. A coil spring 57 is arranged to move one end of the lever down as shown. The opposite end of the lever is forked at 58 and carries a roller 59 which is engaged by a cam 60 mounted on a camshaft 61 by means of a collar 62 and set screw 63. The camshaft is mounted in two bearings 90 and 91 as shown. A collar 92 prevents sliding of the shaft. By appropriate shape of the cam and angular location of the cam on the shaft, the valves can be actuated over any desired fraction of a cycle. (In Fig. 3 part of the camshaft is broken away to give a clear plan view of one of the levers 52.)

Referring to Figs. 1 and 2, it is apparent that in one position (Fig. 1) the unit serves to open the hydraulic valve 28 and when moved to the other position (Fig. 2) it closes the hydraulic valve.

The valve housings have openings 65 extending therethrough (Fig. 4) and the stack is held together by four rods 66 extending clear through the stack and through plates 18 and 19 and retained by nuts 67. Gaskets are interposed between the several units as indicated at 68 (Fig. 3).

The assemblage shown in Fig. 3, having five valve units, is well adapted for use with filters. The rear closure 19 is shown by itself in Fig. 6. It has four holes 106 for reception of rods 66, and the two apertures 20 and 21 for connection to waste and pressure respectively. A slightly raised flat platform 107 (Figs. 3 and 6) abuts the rear end of the stack of valve units.

The valve units and end closures 18 and 19 have small bores 108 for reception of dowel pins 109 to insure proper alinement of the several units.

The valves are actuated at proper times by the aid of a motor 70, under manual or automatic control, adapted to drive the camshaft 61 through a transmission including a worm 72 coupled to the motor shaft 73 through a flexible coupling 74, and driving a worm wheel 75 which drives a jack shaft 76 through a conventional one-way clutch 77. A worm on shaft 76 (not appearing in the figure) drives a worm wheel 78 attached to the camshaft with the aid of a set screw 79, as shown. The reason for the provision of the one way clutch is so that the valve unit may be readily operated manually independently of the motor. Means for doing this include a squared shaft 80 connected to jack shaft 76 with bevel gears 81 and adapted to take a crank, not shown. The motor is mounted on a base plate 100 which at its rear portion has three sets of holes 101, 102 and 103, spaced apart by a distance equal to the thickness of each valve unit. The rear end of the base is attached to a platform 104, unitary with rear closure 19 (Fig. 6) by a pair of screws 105 through the appropriate pair of holes; 101 in the drawings. With this arrangement, on taking out one of the valve units to make a smaller stack, the base plate is attached to platform 104 through holes 102, and if two units are taken away, holes 103 are used.

The outer end of the camshaft communicates with conventional position-indicating and motor-switching means indicated at 82 which per se forms no part of the invention.

While the pilot valve has been described with particular reference to piston-type gate valves, it is of course not restricted in its application to this particular utility, but is well adapted for use in any system involving hydraulically or pneumatically actuated mechanism and requiring a pilot control valve. In the specification and claim, the term hydraulic is used for brevity to include systems wherein a gas as well as a liquid is the motive fluid, the invention being, of course, equally well adapted to such utilizations. The apparatus is easy to make liquid- and gas-tight.

The apparatus is embodied in any suitable material such as is ordinarily used in apparatus handling liquids; for instance, bronze or stainless steel in the case of water as the motive liquid, or plain steel if the motive fluid is oil or air. If oil is employed as the motive liquid, valve discs 41 and 42 are best made of leather or other oil resistant resilient material.

The device is essentially simple to construct, involving only simple mechanical operations, and changing the number of units in the stack is a very simple matter. It mainly requires substituting a new set of rods 66 and a new camshaft 61 of a suitable length.

What I claim is:

In a valve mechanism a plurality of valve units juxtaposed to form a stack, each unit comprising a housing, partition means in each housing defining two separate chambers therein open at opposite ends of the housing and communicating directly with corresponding chambers of adjoining housings, closures for covering the exposed ends of the outermost housings in the stack, screw means for holding said housings and closures together in fluid tight relationship, means in said closures for connecting one of said sets of communicating chambers with a source of pressure fluid and the other of said sets with a point of disposal, two other fluid chambers in each of said housings, ports leading from each of the first named chambers into each of said other fluid chambers, valve members for said ports, stems for said valve members, a shaft co-extensive with the stack, cams on the shaft adapted to move the stems upon rotation of the shaft, and means for rotating the shaft.

ERIC PICK.